United States Patent
Asano et al.

(10) Patent No.: US 7,103,733 B2
(45) Date of Patent: Sep. 5, 2006

(54) COMPUTER SYSTEM OBTAINING INFORMATION ON CAPACITY AND USAGE OF AN AREA USED BY A COMPUTER AND NOTIFYING THE COMPUTER THE STATUS THEREOF

(75) Inventors: Masayasu Asano, Yokohama (JP); Yasunori Kaneda, Sagamihara (JP); Toru Nojiri, Shinjuku (JP)

(73) Assignee: Hitachi, Ltd., Tokyo (JP)

( * ) Notice: Subject to any disclaimer, the term of this patent is extended or adjusted under 35 U.S.C. 154(b) by 516 days.

(21) Appl. No.: 10/302,153

(22) Filed: Nov. 21, 2002

(65) Prior Publication Data
US 2003/0191909 A1 Oct. 9, 2003

(30) Foreign Application Priority Data
Apr. 8, 2002 (JP) .............................. 2002-105346

(51) Int. Cl.
 *G06F 12/00* (2006.01)
(52) U.S. Cl. .................... 711/156; 711/154; 711/112
(58) Field of Classification Search ................ 711/154, 711/156, 170; 709/203, 225
See application file for complete search history.

(56) References Cited

U.S. PATENT DOCUMENTS 6,404,444 B1 * 6/2002 Johnston et al. ............ 715/839

2002/0143942 A1 * 10/2002 Li et al. ...................... 709/225
2002/0156828 A1 * 10/2002 Ishizaki et al. ............. 709/201

FOREIGN PATENT DOCUMENTS

JP    2001-022616    1/2001

OTHER PUBLICATIONS

Microsoft Windows 95 Resource Kit pp. 653-671, Microsoft Press, 1995.*
English translation of "SSPs That Support Service Enterprise," Nikkei System Provider, Mar. 16, 2001.

* cited by examiner

*Primary Examiner*—Hong Kim
(74) *Attorney, Agent, or Firm*—Hogan & Hartson, L.L.P.

(57) ABSTRACT

A computer system includes a plurality of computers and at least one storage connected to the plurality of computers. The storage includes a device that obtains information concerning areas within the storage that are used by the respective plurality of computers, a device that obtains information concerning a capacity within each of the areas that is used by each of the plurality of computers to store-data, and a device that notifies at least one of the plurality of computers of a status of the areas within the at least one storage. The computer system utilizes and manage the storage, without having each of the computers utilize and manage the storages with regard to storage capacity.

8 Claims, 7 Drawing Sheets

| Volume ID (200) | Computer Name (201) | Data Management Method (202) | Capcity (203) | Used Capacity (204) |
|---|---|---|---|---|
| 1 | A | 1 | 300G | 200G |
| 2 | B | 2 | 100G | 95G |
| 3 | C | 2 | 100G | 5G |

| Volume No. (210) | Warning Policy (211) | Addition Warning Policy (212) | Notification Destination (214) |
|---|---|---|---|
| 1 | Utilization 90% or more | Increase 10% when utilization is 90% or more | Taro |
| 2 | Utilization 95% or more | Increase 100G when utilization is 95% | Ichiro |
| 3 | None | None | Ichiro |

| Storage Capacity (220) | Max. Storage Capacity (221) | Warning Policy (222) | Notification Destination (224) |
|---|---|---|---|
| 1T | 2T | Utilization 90% or more | admin |

| User Name (230) | User Information (231) |
|---|---|
| Taro | taro@aaa.jp |
| Ichiro | ichiro@bbb.jp |
| admin | admin@ccc.jp |

200 : Volume Informaiton Table
210 : Volume Management Policy Table
220 : Storage Capacity Table
230 : User Information Table

400: Storage Information Update History Table

COMPUTER SYSTEM OBTAINING INFORMATION ON CAPACITY AND USAGE OF AN AREA USED BY A COMPUTER AND NOTIFYING THE COMPUTER THE STATUS THEREOF

BACKGROUND OF THE INVENTION

Field of the Invention

The present invention relates to a computer system, a storage apparatus and a storage apparatus utilization and monitoring method, and more particularly to a computer system connected with at least a storage apparatus, and a storage apparatus (hereafter also referred to as "storage"), as well as a storage utilization monitoring method, in which the storage itself can utilize and monitor the usage status of the storage.

The amount of data in storage in computer systems that corporations utilize and manage has been increasing in recent years, which has caused the utilization and management of storage to become more complex and increased the costs for such utilization and management. One way to solve this problem is to have the utilization of storage in the computer systems of corporations handled by vendors called storage service providers (SSP), who utilize and manage storage for their clients.

An SSP is a business that has a plurality of storages and divides the storages to provide them to a plurality of users. Users who let an SSP utilize the storage and entrust their data with the SSP can reduce the cost of utilizing and managing their data (see "SSPs That Support Service Enterprises." Nikkei System Provider 16 Mar. 2001).

As part of the SSP's services, utilizing and monitoring the usage status of the users' storages are useful in taking over the utilization and management of the storages for the users. In fact, utilizing and monitoring the usage status of storage are functions necessary not only for the SSP but in general, in order for a computer to operate normally within an area of storage allocated to that computer.

There is a known technology regarding monitoring of storage capacity as part of usage status of storage. The technology involves automatically monitoring the used capacity of disks that comprise a storage, where a computer that uses the storage automatically ascertains the used capacity on the disks, and when the used capacity exceeds a predetermined reference value a warning is given to an administrator of the computer via electronic mail. However, this technology entails the problems described below.

In general, when a computer uses a storage, the method employed in using the storage is determined by a file system that the computer uses. For this reason, although the storage can obtain information concerning volumes that the storage itself has created, it cannot ascertain how the computer is using the volumes. For example, the storage cannot ascertain how much of the volume capacity the computer is using.

Although storages that actually have their own file systems, such as NAS (network attached storage), can ascertain information described above, due to the fact that the NAS must have network connections such as TCP/IP and requires file I/O in the network file system, it cannot work with SCSI, fibre channel connections, or block I/O access.

In order to ascertain the capacity of storage used by the computer or a user in a storage that is compatible with SCSI, fibre channel storage connections, or block I/O access, a function that allows the computer to monitor the capacity of the storage must be adopted. However, this requires adopting a separate storage monitoring function into the computer in addition to the normal utilization of the computer, and this creates a load on the operations of the computer and increases load on the user with regard to utilization and management.

In the meantime, due to the structure of the SSP, users who are clients of SSPs tend not to want utilization and monitoring services that SSPs offer for the reasons described above. On the SSP administrators' side, managing the computers themselves is not part of their business purposes and they tend to want to avoid an increase in the number of actual devices they utilize and manage. As a result, both the users who are the clients of the SSPs and the SSP administrators tend not to want to have storages utilized and managed through the use of utilization and management functions in the computers themselves.

SUMMARY OF THE INVENTION

The present invention therefore relates to a computer system, a storage, and a storage utilization and management method that make it possible to utilize and manage storage, without having computers utilize and manage storage with regard to storage capacity.

In accordance with one embodiment of the present invention, a storage itself monitors the usage status of an area used by a computer, monitors and retains read/write positions in the storage based on I/O data information from the computer, and thereby obtains the usage status of the area used by the computer.

In accordance with an embodiment of the present invention, in a computer system having one or more computers and one or more storages connected to those computers, the storage has a device that obtains information concerning an area of the storage that each computer uses, a device that obtains information concerning the capacity of the area within its area that each computer uses to actually store data, and a device for the storage to notify the computer or the computer user of the status of the area.

In addition, the storage also may have a device to create new areas within the storage when the used capacity of the area increases; a device to notify, after creating new areas, the user who will use the newly created areas of the fact that new areas have been created; and a device to notify, when the areas available for creating new areas within the storage decrease as a result of an increase in the areas created, the user who administers the storage of the necessity of a new disk device within the storage in order to be able to create new areas.

By providing the storage with the devices described above, the need is eliminated for the computer itself to have a function to utilize and manage the storage and any load on the computer used by the user uses can also be eliminated, according to the present invention. For the administrator of the storage, the only actual device that he or she has to manage is the storage, which allows him or her to manage intensively the usage status of the storage, which in turn reduces management costs.

Other features and advantages of the invention will be apparent from the following detailed description, taken in conjunction with the accompanying drawings that illustrate, by way of example, various features of embodiments of the invention.

PREFERRED EMBODIMENTS

A computer system, a storage and a storage utilization and management method in accordance with embodiments of the present invention are described below in detail with reference to the accompanying drawings.

Figure 1:
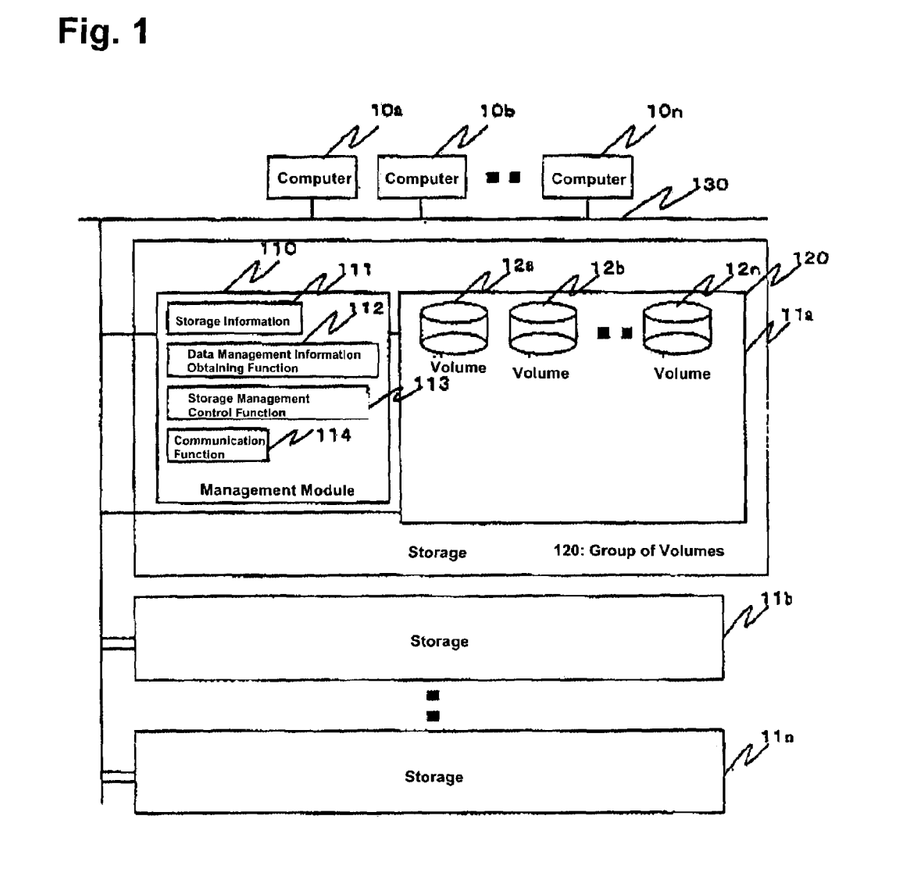
FIG. 1 shows a block diagram indicating the configuration of a computer system in accordance with one embodiment of the present invention.
Figure 2:
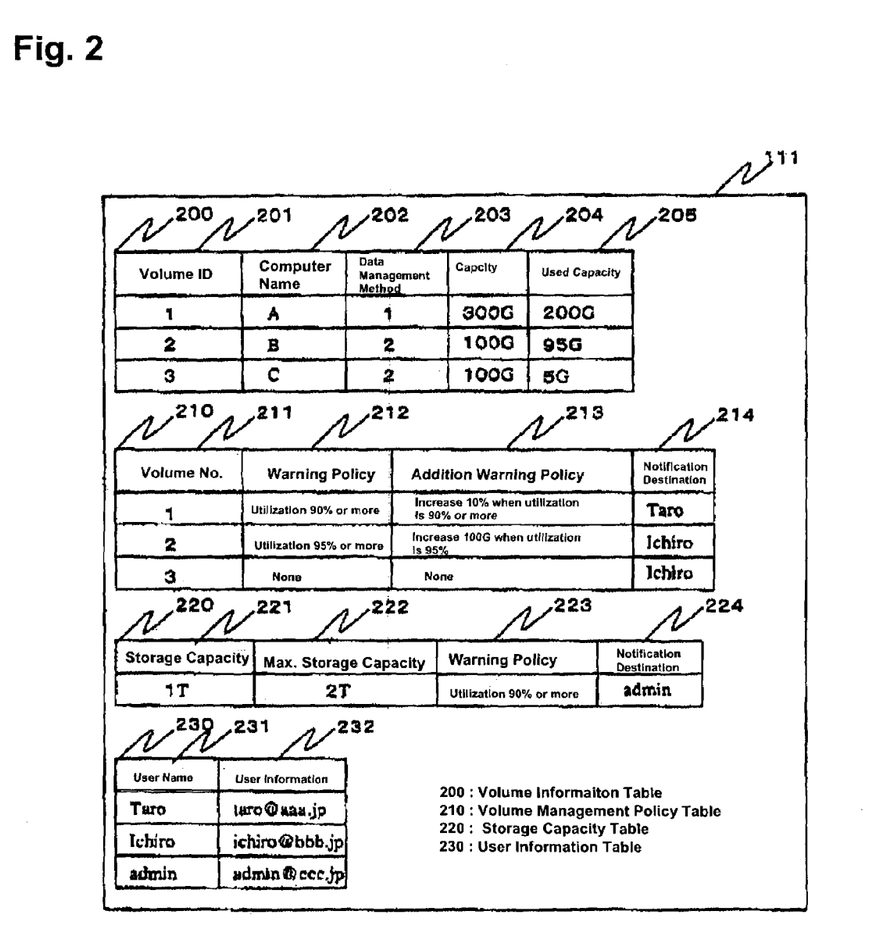
FIG. 2 shows a drawing illustrating an example of storage information.

FIG. 1 is a block diagram showing the configuration of a computer system according to one embodiment of the present invention, and FIG. 2 is a drawing that illustrates an example of storage information. In FIGS. 1 and 2, 10a–10n are each a computer, 11a–11n are each a storage, 110 is a management module, 111 is storage information, 112 is a data management information obtaining function, 113 is a storage management control function, 114 is a communication function, 12a–12n are each a volume, 120 is a group of volumes, 130 is a communication path such as a cable, 200 is a volume information table, 210 is a volume management policy table, 220 is a storage capacity table, and 230 is a user information table.

The computer system according to the embodiment of the present invention includes a plurality of computers 10a–10n and a plurality of storages 11a–11n connected by the cable 130. The plurality of storages 11a–11n all may have the same configuration, and FIG. 1 shows the internal configuration only of the storage 11a. By using the storage 11a as a representative of the entire storages, its internal configuration will be described.

The storage 11a comprises the group of volumes 120 and the management module 110 that manages and controls the storage 11a and that can communicate with each of the computers 10 via the cable 130, which connects each computer 10 with the storage 11a. The group of volumes 120 is a set of volumes, each of which is the minimum unit of storage available to be provided to each of the computers 10a–10n in the area manage by the storage 11a, and it comprises a plurality of volumes 12a–12n that accepts, via the cable 130, I/O requests from computers among the computers 10a–10n that use the storage 11a.

The management module 110 comprises the storage information 111 that retains information concerning area available for use by each of the computers (not necessarily all) among the computers 10a–10n that uses the group of volumes 120 and information concerning area actually used by those computers 10; the data management information obtaining function 112, which is a function to obtain data management formats to use the volumes 12; the storage management control function 113, which is a function to actually control the storage 11a, such as setting the volumes 12; and the communication function 114, which is a function to allow communication, via the cable 130, between the storage 11a and the computers 10a–10n.

The communication function 114 may be conventional electronic mail functions. The data management information obtaining function 112 is a function that, depending on the data management method (for example, FAT, NTFS) such as a file system that each computer 10 uses, is used to obtain data locations and locations on disks of data and files used by each of the computers 10. The cable 130 can be a cable that uses a fibre channel or Ethernet (a registered trademark), and may in some cases be separate networks of fibre channel and Ethernet (a registered trademark). In the latter case, a plurality of communication devices may be located on the computers 10a–10n and the storages 11a–11n, depending on the type of the cable.

Among the computers 10a–10n, besides computers 10 that actually use the storages 11a–11n, there may be a computer that works in conjunction with the communication function 114 of the storage 11a to obtain information concerning the storage 11a, that does not use disks within the storage 11a, and that register setting requests to the storage 11a (hereinafter called a "management terminal"). Further, the functions of the management terminal may be incorporated into the computers 10 that use the storages 11a–11n.

The computer system according to the embodiment of the present invention that is comprised as described above may be a computer system utilized by a specific user or a computer system utilized by an SSP.

If the computer system shown in FIG. 1 is a computer system utilized by an SSP, the computers 10a–10n issue requests concerning the storage from clients and clients' servers to the SSP, and are also the management terminals of the clients who obtain information from the storages 11, as well as the management terminals through which the SSP administrator obtains storage information. Additionally in this case, the storages 11a–11n are storages provided to clients by the SSP with a price attached to the volumes 12 of each storage 11. Further, one or more volumes 12a–12n becomes a unit of storage provided to the each client by the SSP.

The storage information 111 that the management module 110 has comprises, as shown in FIG. 2, the volume information table 200, the volume management policy table 210, the storage capacity table 220 and the user information table 230. The storage information 111 is used to utilize and monitor the storage 11 on which the management module 110 is provided.

The volume information table 200 is a table that manages information concerning the volumes 12 set within a storage (the storage 11a in this case). The volume information table 200 stores, for each volume ID 201 assigned to identify each volume 12 defined within the storage 11a, a computer name 202 for the computer 10 that uses the volume 12, a data management method 203 in which the data management method used by the volume 12 is registered, a capacity 204 of the volume 12 available for use by the computer 10, and a used capacity 205 that the computer 10 actually uses. Each of the values stored in the computer name 202 is an identifier for each of the computers 10a–10n. The data management method 203 is an identifier for the data management method, such as a file system, that each computer 10 uses. The data management information obtaining function 112 refers to this value and obtains the status of data location on each computer 10. Here, for the sake of simplification, we will assume that each volume 12 is managed by one data management method. It is possible to divide one volume 12 into a plurality of partitions by a plurality of different data management methods, and to utilize the volume 12 in that manner. If this were the case, for each volume 12, information for each partition should be managed under the same headings as in the volume information table 200, so that the volume ID 201 heading becomes partition identifiers, and the capacity 204 and the used capacity 205 become information for each partition.

The volume control policy table 210 stores a volume ID 211, which is the same as the volume ID 201 described earlier; an addition warning policy 212 that designates, depending on the volume usage status, whether to give a warning when the utilization rate of the volume 12 increases; an addition policy 213 that designates whether to add volumes 12 depending on the volume usage status; and a notification destination 214 that designates the user that the communication function 114 notifies concerning warnings and additions. The volume management policy table 210 is set by the user of each volume 12. Depending on the contents of these headings, the storage 11a warns the appropriate user or adds the volumes 12 for the appropriate user.

The storage capacity table 220 stores a storage capacity 221, which is the capacity of each storage 11 that is actually available for use; a maximum storage capacity 222 that registers the maximum value of the storage capacity available for use as a result of adding disks; a warning policy 223 that designates whether to give a warning when the used capacity 221 of the storage approaches the value of the maximum storage capacity 222, i.e., when there is a high possibility that the disks in the storage 11a may become insufficient; and a notification destination 224 that designates the user that the communication function 114 notifies concerning warnings. The notification destination 224 is designated by the administrator of the storage 11a. When a storage administrator is designated as a notification destination, the storage administrator can be urged through warnings to add new disks to the storage 11a or to perform other designated tasks. The storage capacity table 220 is used as information to determine when to add the volumes 12 and when to warn the storage administrator of the possibility of insufficient storage capacity. The warning policy 223 and the notification destination 224 are set by the storage administrator.

In the user information table 230 are stored a user name 231, which is a name of the user to whom the storage usage status is notified; and user information 232, which is information required for the communication function 114 to notify the user of information from the storage 11a. If the communication function 114 uses electronic mail functions, an electronic mail address is set in the user information 232, so that the communication function 114 can use the user information 232 to notify the user of storage information.

Figure 3:
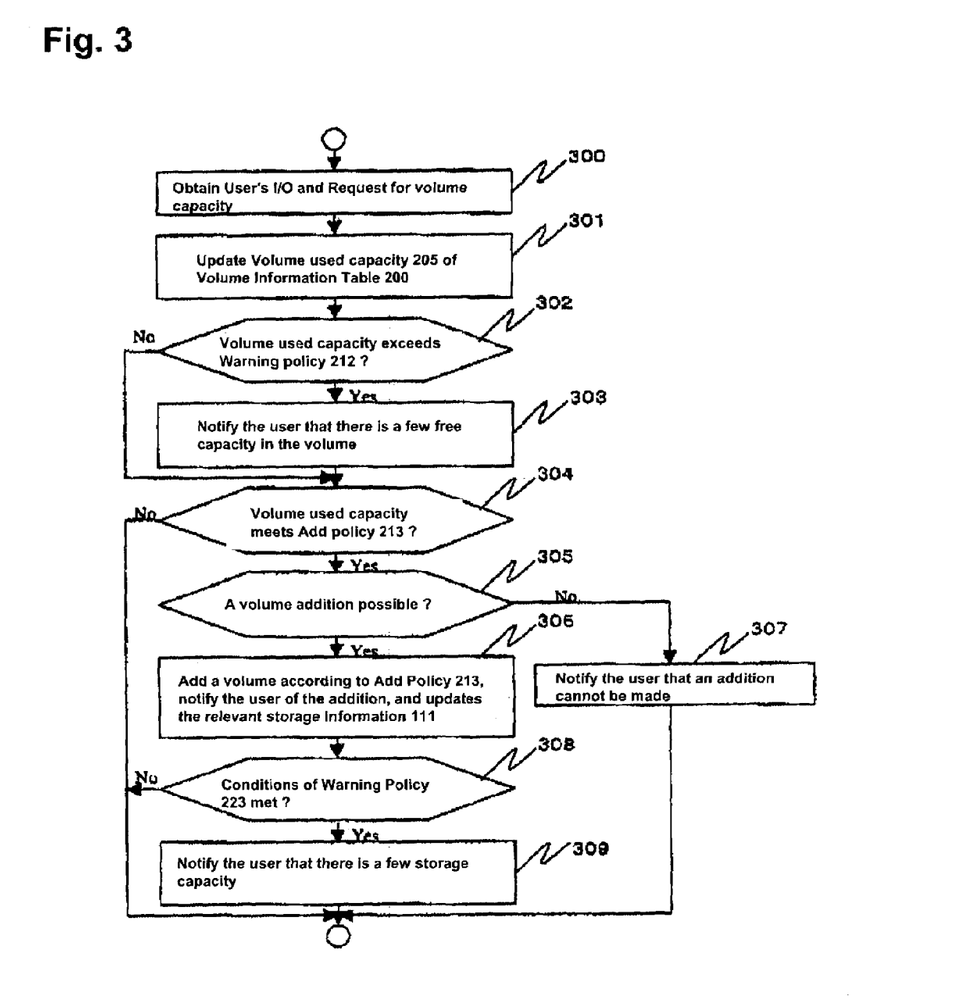
FIG. 3 shows a flowchart illustrating processing operations that take place to monitor the used capacity of volumes within a storage.

FIG. 3 is a flowchart that describes the processing operations that take place to monitor the used capacity of one of the volumes 12 within the storage 11a. This processing is executed by the management module 110 of the storage 11a by using the functions and information that the former has.

(1) When the management module 110 receives a request directed to the storage 11a from one of the computers 10, the data management information obtaining function 112 gains information concerning the change in the amount of used capacity of one of the volumes 12 in relation to the request to use the storage 11a from the computer 10. In addition, the data management information obtaining function 112 uses the information in the data management method 203 of the volume information table 200 to ascertain the used capacity of the volume 12, in accordance with the data management method of the volume 12 (step 300).

(2) Based on the used capacity of the volume 12 as ascertained in the processing in step 300, the management module 110 recognizes that a change has occurred in the used capacity of the volume 12 that it manages and makes changes through the volume information table 200 to the used capacity 205 for the volume 12 having the volume ID that is used by the computer 10 that made the request (step 301).

(3) Next, the management module 110 uses the volume information table 200 and the volume management policy table 210 to check whether the used capacity of the volume 12 matches the status designated by the warning policy 212. In other words, the management module 110 calculates the percentage is of the capacity 204 available for use in the volume information table 200 that the used capacity 205, which is the actual used capacity, is at; and the management module 110 checks whether this value matches the status designated by the warning policy 212 of the volume management policy table 210 (step 302).

(4) If as a result of checking in step 302, the status is found to be the status designated by the warning policy 212, e.g., in FIG. 2, if the utilization rate of the volume 12 whose volume ID is 2 in the volume information table 200 is found to be 95% upon calculation, which matches the status designated by the warning policy 212 of the volume management policy table 210, the management module 110 uses the communication function 114 to notify the user in the notification destination 214 of the volume management policy table 210 of the warning concerning the usage status of the storage 11a (step 303).

(5) If as a result of checking in step 302 the status is found not to be the status designated by the warning policy 212, or if after the processing in step 303 the used capacity of the volume 12 is checked using information in the volume information table 200 to see whether its status is the status designated by the addition policy 213 of the volume information table 200 and found not to be the status designated by the addition policy 213, the processing is terminated in this step since no additions are necessary yet (step 304).

(6) If as a result of checking in step 304, the status is found to be the status designated by the addition policy 213, e.g., the utilization rate of the volume 12 whose volume ID is 2 is 95% in the volume information table 200, which matches the status designated by the addition policy 213, whether an addition of a new volume 12 is possible is checked next using the storage capacity table 220 (step 305).

(7) If as a result of checking in step 305, an addition cannot be made, the management module 110 uses the communication function 114 to notify the user in the notification destination 214 of the volume management policy table 210 of the fact that a new volume 12 cannot be added, and terminates the processing. When there is a storage administrator in addition to the user, such as with SSPs, the notification that an addition cannot be made can be sent to the administrator (step 307).

(8) If as a result of checking in step 305 an addition is possible, e.g., in FIG. 2, if the storage capacity 221 is 1T and the maximum storage capacity is 2T in the storage capacity table 220, this indicates that 1T may be added to the existing storage configuration. In the meantime, if the volume 12 in question is the volume 12 whose volume ID is 2, the request from the addition policy 213 of the volume management policy table 210 is a request for an addition of 100 GB, which is considered allowable, and the storage management control function 113 therefore adds a volume 12 in accordance with the addition policy 213. The management module 110 uses the communication function 114 to notify the user in the notification destination 214 of the volume management policy table 210 of the fact that the volume 12 has been added. Furthermore, with the addition of the volume 12, the storage capacity table 220 is updated. For example, if 100 GB were added in accordance with the addition policy 213 for the volume 12 whose volume ID is 2, the value in the storage capacity 221 is updated to a value of 1T plus 100 GB. At the same time, an ID is assigned to the newly added volume 12 in the volume information table 200 and the volume management policy table 210, so that a new line is added to each of the tables, and an entry is added to each of the volume information table 200 and the volume management policy table 210 when setting the new volume 12 available for use by the computer 10 (step 306).

(9) After completing the processing in step 306, the management module 110 checks whether the status is the status designated by the warning policy 223 of the storage capacity table 220, and if the status is not the status designated by the warning policy 223 the processing is terminated in this step. For example, if the value of the storage capacity 221 is 1T and the value of the maximum storage capacity 222 is 2T in the storage capacity table 220, the utilization rate is 50%, which does not satisfy the requirement for the warning policy 223, and the processing is terminated (step 308).

(10) If as a result of checking in step 308, the status is found to be the status designated by the warning policy 223, e.g., if the value of the maximum storage capacity 222 is 2T and the value of the storage capacity 221 is 1.9T in the storage capacity table 220, the utilization rate is 95%, which matches the status designated by the warning policy 223; consequently, the management module 110 uses the communication function 114 to notify the user in the notification destination 224 of the storage capacity table 220 of the warning concerning the status of the storage capacity (step 309).

The present embodiment according to the present invention makes it possible for the storage 11a itself to monitor the usage status of the storage 11a, to notify the user or the administrator, and to automatically add new volumes 12, by having the processing described above executed in the storage 11a itself, and without having to install monitoring software on any of the computers 10. In addition, since the used area of the storage 11a itself can be monitored at all times, the storage administrator can respond flexibly to disk additions within the storage 11a depending on the usage status of the storage 11a.

Furthermore, since the present embodiment according to the present invention allows an exchange of information between the user and the storage 11a without having to go through the administrator even when the storage 11a is utilized by an SSP, the time it takes to make changes to the storage setting can be shortened. When the storage is utilized in a manner that requires authorization in relation to storage settings, i.e., when no one other than the storage administrator is allowed to set or change the storage settings, the notification between the storage 11a and the user described above can be made via the storage administrator.

When adding a new volume 12 in the processing in step 306, if the computer 10 that is to use the new volume 12 has a volume expansion function, an existing volume 12 with an existing volume ID may be expanded in the storage 11a.

By utilizing an SSP in the manner described above, the need to provide extra software to the computers 10 of the SSP's clients is eliminated, and the volume usage status of the SSP's clients can be ascertained by the utilization of the storage 11a. The SSP administrator can at any time monitor the SSP clients' volume usage status through the utilization of the storage 11a, which would allow the administrator to give warnings early and to automatically add new volumes 12; as a result, the SSP can provide to its clients services that are equivalent to services that clients would have if software that monitors the usage status of the storage 11a were installed on the clients' computers. From the SSP clients' perspective, this arrangement does not create any new load on their computers since the clients do not have to install extra software.

In accordance with the embodiment of the present invention, a setting, used to notify the storage administrator (or the SSP administrator) of any changes to any of the values in any of the tables in the storage information 111 whenever a change is made, can be included in the storage information 111. By doing this, the storage administrator can comprehensively ascertain changes to the usage status of the entire storage 11a. Further, by installing on the storage 11a software that comprehensively displays the information provided from the storage 11a to the administrator, the administrator can realize more reduction in the management cost.

In accordance with the embodiment of the present invention, the management module 110 can be provided with a function to separately retain each of the tables in the storage information 111 periodically or a whenever a change is made to any of the tables, which makes it possible to ascertain the volume usage status for each period. Based on this information, the management module 110 can provide the user with the volume usage status, which can be used by the user to make his or her decision regarding his or her use of the volumes 12.

Figure 4:
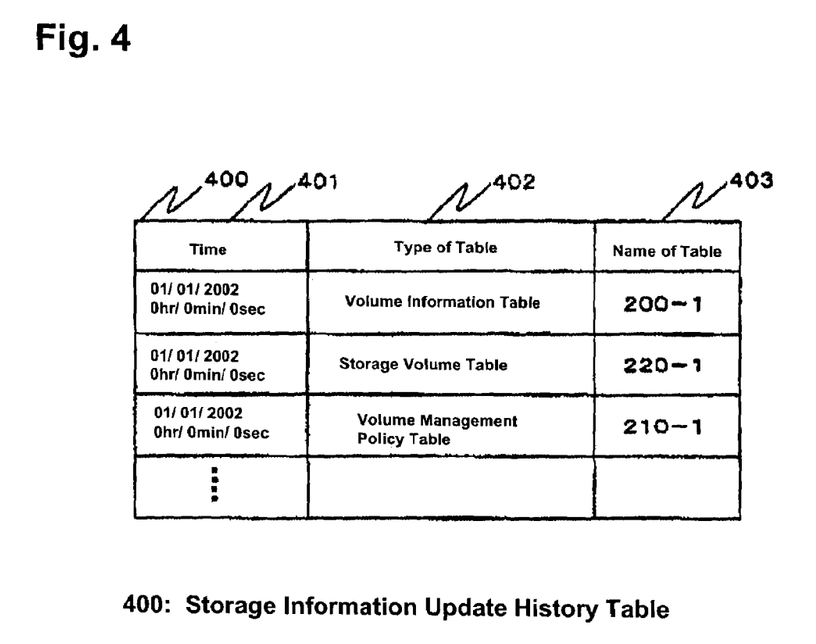
FIG. 4 shows a table indicating the structure of a storage information change history table.

FIG. 4 is a table showing the structure of a storage information change history table. This table manages information retained for each of the tables managed by the storage information 111 when the tables are separately retained periodically or whenever a change is made to any of the tables.

The storage information change history table 400 shown in FIG. 4 comprises time 401, which is the time at which a table in the storage information 111 was retained; a table type 402, which is the type of table in the storage information 111; and a table name 403, which is the name of the table that was retained. By referring to the table 400, it is possible to determine that storage information 111 was retained at the time indicated in the time 401. For example, if each of the tables in the storage information 111 is retained periodically (for example, every hour), it becomes possible to notify the user of the volume usage status on an hourly basis and the user can check the volume usage status in a chronological order.

Or, for example, when there is a change made to the content of the storage information 111, a change history of the volumes 12 can be obtained since the tables are separately retained, and the user can be notified of the trend in the volume usage status by providing this information to the user. Users whose utilization rate of the storage 11a has not increased can be urged to change volume settings. By doing this, the operational rate of the storage 11a can be increased, so that the storage 11a can be used efficiently.

In other words, if a plurality of users is each using a separate volume 12, the usage status of each user can be found from the content of the storage information change history table 400; users who are hardly using their volumes 12 can be urged to reduce the amount of the volumes 12 they have, and once the amount of their volumes 12 is reduced, new volumes 12 can be added for other users; in this way the storage resources can be used efficiently. If the storage is utilized by an SSP, the SSP can urge its clients to add or reduce their volumes 12 by a flexible pricing of such additions and reductions of the volumes 12.

If data locations within the volumes 12 are obtained and the data locations are found to be fragmented, the embodiment of present invention can notify the user of it and urge the user to optimize the data locations. The processing operations that take place in such a situation will be described next.

Figure 5:
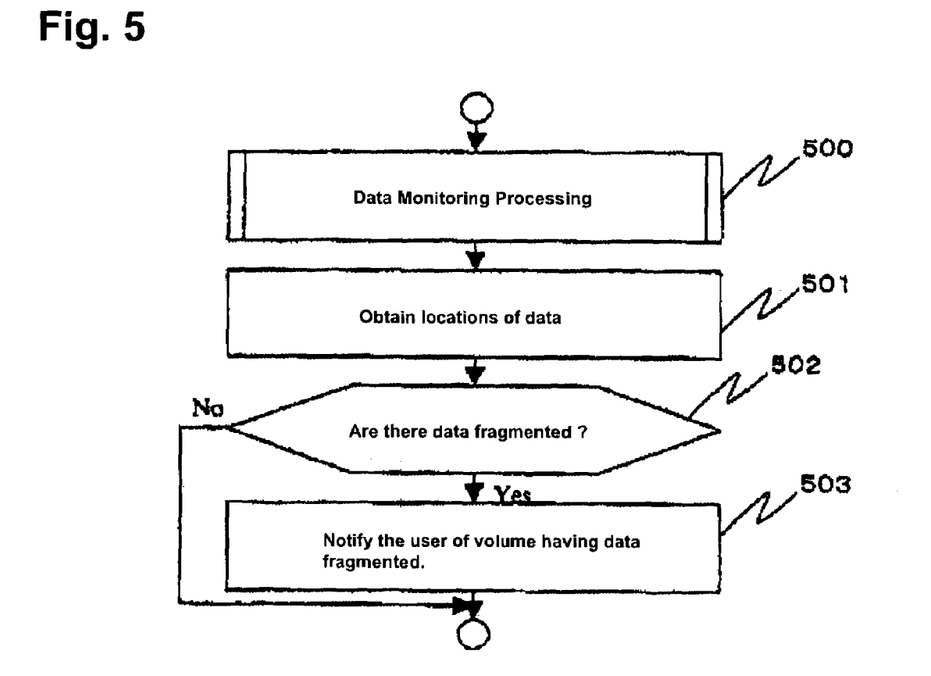
FIG. 5 shows a flowchart illustrating the processing operations that take place to notify the user of information concerning data locations.

FIG. 5 is a flowchart that describes the processing operations to notify the user of information concerning data locations.

(1) First, the data monitoring processing that monitors the used capacity of the volumes 12, which was described using FIG. 3, is executed. By performing this monitoring processing, an opportunity to notify the user of information concerning data locations can be provided every time there is an access to the storage 11 (step 500).

(2) Next, the relations between the data locations and disk locations within the storage 11 are obtained. For example, information concerning how consistent data (for example, one file) is located among various disks of the storage 11 is obtained. This processing is executed by the data management information obtaining function 112 that obtains the locations of a series of data in each of the volumes 12 in each of the storages 11. For example, the locations of each data in the group of volumes 120 of the storage 11a are obtained. Further, the disk configuration of each storage 11 is obtained from the storage management control 113 and where on the disks each data is located is retained. By doing this, the relations between the data locations and the disks can be obtained (step 501).

(3) Next, whether the data is fragmented is determined based on the relations between the data locations and the disks that were obtained in step 501. For example, when a file is located on disk 1 and disk 2, this data is determined to be fragmented. If there are no fragmented data, the processing is terminated without any further steps (step 502).

(4) If in step 502 there is data that is determined to be fragmented, the communication function 114 is used to notify the fact that the data is fragmented to the user, who is designated to be notified of the status of the relevant volume 12, and the processing is terminated. The user to be notified can be obtained from the value of the notification destination 214 of the volume management policy table 210 and from the user information table 230 that retains information concerning the notification destination user (step 503).

By providing step 500, a processing is activated to notify the user of the information concerning data locations every time there is an access to the storages 11, but if the accesses are made frequently this processing will be activated many times, which can increase processing load on the storages 11 themselves. In consideration of such a situation, a means to activate the processing to periodically notify the user of information concerning data locations can be provided in the present invention, so that the processing begins with step 501.

Additionally, in the processing that takes place in step 503, if the data that is fragmented has fewer changes than other data, a processing to notify or not notify the user of this can be provided in step 503. Changes to data can be determined from the storage information change history table 400 for the storage information 111, which was described using FIG. 4.

In the present embodiment according to the present invention, by performing the processing as described above, each of the storages 11 itself can monitor the data locations and notify the user if it determines that the processing by the storage 11 would become slow due to the data locations, without having the computer monitor the data locations. Upon receiving the notice, the user can automatically obtain information from the storage 11 that the user can use to optimize the data locations.

If the storage 11 is utilized by an SSP, the storage 11 can still be utilized in the manner described and provide the monitoring services described; consequently, the SSP administrator can, without having to provide extra software on the clients' computers, monitor the data locations at all times through the utilization of the storage 11 and give warnings if any data is found to be fragmented. From the SSP clients' perspective, this arrangement does not create any new load on their computers since they do not have to install extra software.

Figure 6:
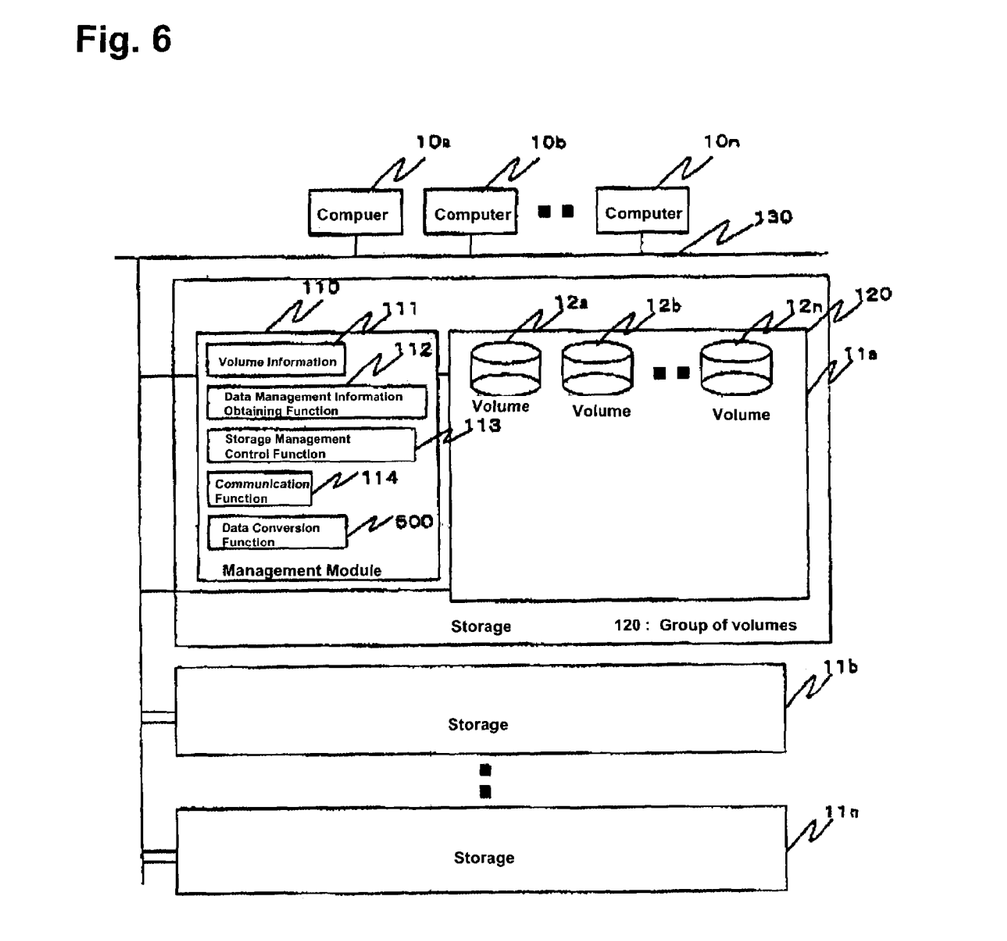
FIG. 6 shows a block diagram indicating a configuration of a computer system according to another embodiment of the present invention.
Figure 7:
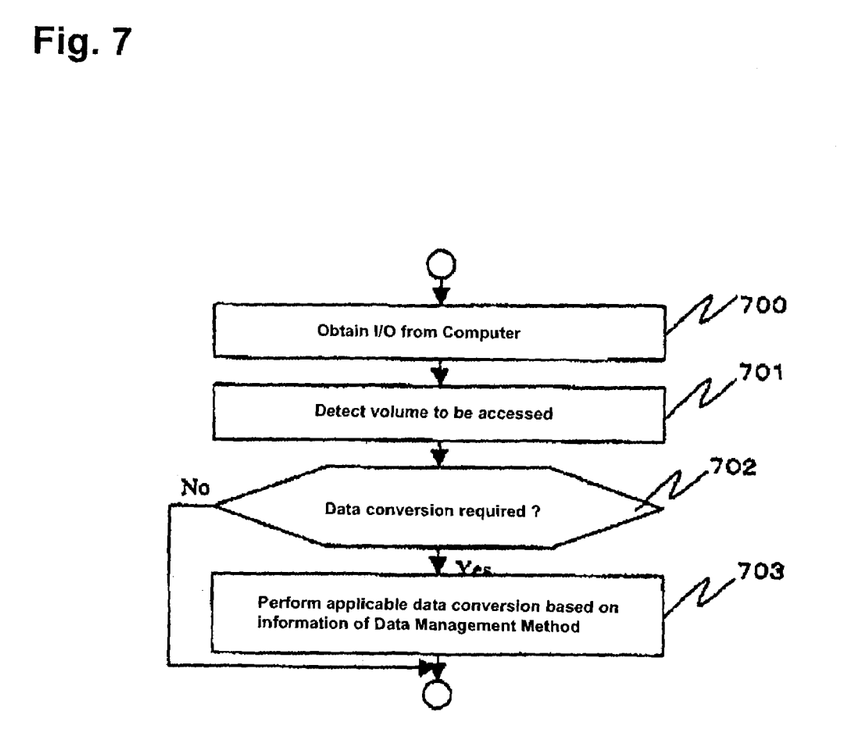
FIG. 7 shows a flowchart illustrating a data obtaining procedure concerning data access through sharing of volumes having different data management methods.

FIG. 6 is a block diagram indicating the configuration of a computer system in accordance with another embodiment of the present invention, and FIG. 7 is a flowchart illustrating a data obtaining procedure concerning data accesses performed when volumes 12 having different data management methods are shared. The embodiment of the present invention shown in FIG. 6 is an example that makes it possible for a plurality of computers 10 having different data management methods to share the volumes 12 and to operate data. In FIG. 6,600 is a data conversion function, and other numbers are identical to those in FIG. 1.

The computer system in FIG. 6 includes the data conversion function 600 provided in a management module 110 within a storage 11a of a computer system in FIG. 1, and computer system in FIG. 6 is identical to the computer system in FIG. 1 in other respects. By providing the data conversion function 600, it becomes possible for the plurality of computers 10 to obtain data in the volumes 12 having different data management methods. The data conversion function 600 may be provided with a function to manage all access rights to the volumes 12 by each computer 10. Through this, unauthorized accesses to the volumes 12 can be blocked.

Next, referring to the flowchart in FIG. 7, descriptions are made as to the data obtaining procedure concerning data accesses performed when the volumes 12 having different data management methods are shared. This processing is executed by the management module 110 provided in each of the storages 11.

(1) When one of the storages 11 receives an I/O request from one of the computers 10, the management module 110 determines which of the volumes 12 the I/O request's access is for (steps 700 and 701).

(2) Next, the management module 110 determines whether the data management method currently designated for the volume 12 to be accessed is different from the actual data management method. This determination can be made using the information in a volume information table 200. For example, if a computer A and a computer B share the volume 12, whose volume ID is 2, of the computer B, it is possible to determine from the volume information table 200 that the data management methods of the computer A and the computer B are different (step 702).

(3) If the determination in step 702 shows that the data management methods are not different, the processing is terminated without any further steps. In this case, since the data management methods are the same, data can be obtained by the data management information obtaining function 112 using the same data management method.

(4) If the determination in step 702 shows that the data management methods are different and that data conversion is required, the data conversion is performed using the data conversion function 600. For example, in FIG. 2, since the information from a data management method 203 shows that the data management method for the computer A is "1," while the data management method for the computer B is "2," an access with the data management method "1" from the computer A is converted to an access with the data management method "2." In this way, data in the volume 12 whose volume ID is 2 and that is managed by the computer B can be obtained from the computer A as well. Consequently, once this processing is completed, the computer A can obtain the computer B's data, which is data in the data management method "2," as data whose data management method is "1" (step 703).

Through the processing described in FIG. 7, data managed under different data management methods can be shared and different computers 10 can obtain the data, without having to use data sharing software on the computers 10.

When the storage 11 is managed by an SSP, the SSP can provide a data sharing service by having the storage 11 perform the processing described above, without using storages such as NAS with a file server connected on a network, and even if the access method is a block I/O such as in fibre channel and SCSI connection.

Various processing in the embodiments according to the present invention can be configured as a processing program, and such a processing program can be stored and provided in recording medium such as HD, DAT, FD, MO, DVD-ROM and CD-ROM.

According to the embodiment of the present invention, the management module 110 within each of the storages 11 can at all times monitor the usage status of the volumes 12 used by the computers 10 and have the storage 11 notify the user depending on the changes in the usage status, which makes it possible to notify the user of the usage status of the storage 11 without having to install monitoring software on the computer or server that the user uses.

Further in accordance with the embodiment of the present invention, due to the fact that the data conversion function for the volumes 12 is provided in the management module 110 of each of the storages 11, a plurality of computers 10 can obtain data in various volumes 12, even if the data management methods of the various computers 10 are different, without having to install data conversion software on the computers 10.

According to the present invention, the utilization and management of storage can be done without having the computer perform the utilization and management of storage with regard to storage capacity, as described above.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A computer system including at least one computer and at least one storage connected to the computer, the least one storage comprising:
   a device that obtains information concerning an area of the at least one storage that is used by the at least one computer;
   a device that obtains information concerning a capacity within the area that is used by the at least one computer to store data;
   a device that notifies the at least one computer of a status of the area;
   wherein the at least one storage includes a device that creates new areas within the at least one storage when the capacity used in the area increases, a device that notifies the at least one computer that each of the new areas has been created, and a device that notifies the at least one computer, when the area available for creating new areas within the at least one storage decreases as a result of an increase in the areas created, that a new disk device within the at least one storage is necessary to create new areas.

2. A computer system including at least one computer and at least one storage connected to the computer, the least one storage comprising:
   a device that obtains information concerning an area of the at least one storage that is used by the at least one computer;
   a device that obtains information concerning a capacity within the area that is used by the at least one computer to store data; and
   a device that notifies the at least one computer of a status of the area;
   wherein the at least one computer includes a plurality of computers that use the at least one storage, the plurality of computers having a plurality of data management methods, and the at least one storage includes a device that convert data stored in the at least one storage such that the data is obtainable by all of the data management methods.

3. A storage that is connected to at least one computer and is used by the at least one computer, the storage comprising:
   a device that obtains information concerning an area of the storage that is used by the at least one computer;
   a device that obtains information concerning a capacity within the area that is used by the at least one computer to store data;
   a device that notifies the at least one computer of a status of the area;
   a device that creates new areas within the storage when the capacity used in the area increases, a device that notifies the at least one computer that each of the new areas has been created, and a device that notifies the at least one computer, when the area available for creating new areas within the storage decreases as a result of an increase in the areas created, that a new disk device within the storage is necessary to create new areas.

4. A storage that is connected to at least one computer and is used by the at least one computer, the storage comprising:
   a device that obtains information concerning an area of the storage that is used by the at least one computer;
   a device that obtains information concerning a capacity within the area that is used by the at least one computer to store data;

a device that notifies the at least one computer of a status of the area;

a plurality of computers that use the at least one storage, the plurality of computers having a plurality of data management methods, wherein the storage includes a device that converts data stored in the storage such that the data is obtainable by all of the data management methods.

5. A storage that is connected to a plurality of computers, the storage comprising:

a device that obtains information concerning areas within the storage that are used by the respective plurality of computers;

a device that obtains information concerning a capacity within each of the areas that is used by each of the plurality of computers to store data;

a device that notifies at least one of the plurality of computers of a status of the areas within the storage;

a device that creates new areas within the storage when the capacity used in the area increases, a device that notifies at least one of the plurality of computers that each of the new areas has been created, and a device that notifies at least one of the plurality of computers, when the area available for creating new areas within the storage decreases as a result of an increase in the areas created, that a new disk device within the storage is necessary to create new areas.

6. A storage that is connected to a plurality of computers, the storage comprising:

a device that obtains information concerning areas within the storage that are used by the respective plurality of computers;

a device that obtains information concerning a capacity within each of the areas that is used by each of the plurality of computers to store data;

a device that notifies at least one of the plurality of computers of a status of the areas within the storage;

the plurality of computers have a plurality of data management methods, and the storage further comprising a device that converts data stored in the storage such that the data is obtainable by all of the data management methods.

7. A storage utilization and management method for a computer system including a plurality of computers and at least one storage connected to the plurality of computers, the method comprising the steps of:

obtaining information concerning areas within the storage that are used by the respective plurality of computers;

obtaining information concerning a capacity within each of the areas that is used by each of the plurality of computers to store data;

notifying at least one of the plurality of computers of a status of the areas within the storage;

creating new areas within the storage when the capacity used in the area increases; notifying at least one of the plurality of computers that each of the new areas has been created; and notifying at least one of the plurality of computers, when the area available for creating new areas within the storage decreases as a result of an increase in the areas created, that a new disk device within the storage is necessary to create new areas.

8. A storage utilization and management method for a computer system including a plurality of computers and at least one storage connected to the plurality of computers, the method comprising the steps of:

obtaining information concerning areas within the storage that are used by the respective plurality of computers;

obtaining information concerning a capacity within each of the areas that is used by each of the plurality of computers to store data;

notifying at least one of the plurality of computers of a status of the areas within the storage;

wherein the plurality of computers have a plurality of data management methods, and further comprising the step of converting data stored in the storage such that the data is obtainable by all of the data management methods.

* * * * *